United States Patent [19]

Spokoyny

[11] Patent Number: 6,146,605
[45] Date of Patent: Nov. 14, 2000

[54] COMBINED SCR/SNCR PROCESS

[75] Inventor: Felix E. Spokoyny, Costa Mesa, Calif.

[73] Assignee: Hera, LLC

[21] Appl. No.: 09/360,506

[22] Filed: Jul. 26, 1999

[51] Int. Cl.$^7$ .............................. B01J 8/00; C01B 21/00
[52] U.S. Cl. ...................................... 423/239.1; 423/235
[58] Field of Search .................................. 423/235, 239.1

[56] References Cited

U.S. PATENT DOCUMENTS

| | | | |
|---|---|---|---|
| 4,220,635 | 9/1980 | Schell | 423/358 |
| 4,302,431 | 11/1981 | Atsukawa et al. | 423/239.1 |
| 4,602,673 | 7/1986 | Michelfelder et al. | 165/7 |
| 4,978,514 | 12/1990 | Hofmann et al. | 423/235 |
| 4,981,660 | 1/1991 | Leach | 423/235 |
| 5,057,293 | 10/1991 | Epperly et al. | 423/235 |
| 5,139,754 | 8/1992 | Luftglass et al. | 423/235 |
| 5,233,934 | 8/1993 | Krigmont et al. | 110/345 |
| 5,240,688 | 8/1993 | von Harpe et al. | 423/235 |
| 5,252,308 | 10/1993 | Young | 423/358 |
| 5,281,403 | 1/1994 | Jones | 423/235 |
| 5,286,467 | 2/1994 | Sun et al. | 423/239.1 |
| 5,399,325 | 3/1995 | von Harpe et al. | 423/235 |
| 5,510,092 | 4/1996 | Monsour et al. | 423/239.1 |
| 5,543,123 | 8/1996 | Hofmann et al. | 423/235 |
| 5,853,683 | 12/1998 | Gibbons et al. | 423/239.1 |

FOREIGN PATENT DOCUMENTS 1-9655   7/1990   Japan .

OTHER PUBLICATIONS

Huhmann et al., "Evaluation of Retrofitted Post Combustion No$_x$ Control Technology on a Wet Bottom, Coal Fired Utility Boiler," May 15–16 1997, 19 pages, Symposium.

Johnson et al., "Combination of SNCR and SCR NO$_x$ Emission Control Systems. Synergetic Effects and Customer Benefits," Dec. 4–6, 1996, 26 pages, Symposium.

Wallace et al., "Selective Catalytic Reduction Performance Project at Public Services Electric and Gas Company's Mercer Generating Station, Unit No. 2," Symposium, Spring 1995, 22 pages.

Wahlco, "Staged NO$_x$ Reduction System," brochure, 1997, 6 pages, Santa Ana, California.

Fuel Tech, "NO$_x$ OUT Cascade", brochure, 1999, 3 pages, Batavia, Illinois.

Siemens, "SINO$_x$ Catalysts: The Best Solution for Nitrogen–Oxide Reduction", brochure, 10 pages, Germany.

BASF, "BASF DeNO$_x$ Catalysts," brochure, 19 pages, Germany.

*Primary Examiner*—Steven P. Griffin
*Assistant Examiner*—Maribel Medina
*Attorney, Agent, or Firm*—Howard E. Sandler

[57] ABSTRACT

In many situations where the maximum NOx reduction capabilities of conventional SCR systems are not necessary, and alternative SNCR systems may not economically provide desired NOx reduction, a staged SCR/SNCR system is believed to be the most appropriate solution available. By means of the present invention, a system has been developed for delivering NOx reduction agents from a common urea feedstock, when it appropriate to use combined NOx treatment stages (i.e. SNCR within the boiler followed by in-duct SCR and/or catalyzed air preheater elements). For the SNCR stage, the urea from the common feedstock is diluted prior to injection into the boiler and, for the SCR stage, the urea from the common feedstock is used to produce ammonia using hydrolysis. Urea solution which is not converted to ammonia in the SCR phase, is used for dilution of the solution being delivered to the SNCR system.

9 Claims, 1 Drawing Sheet

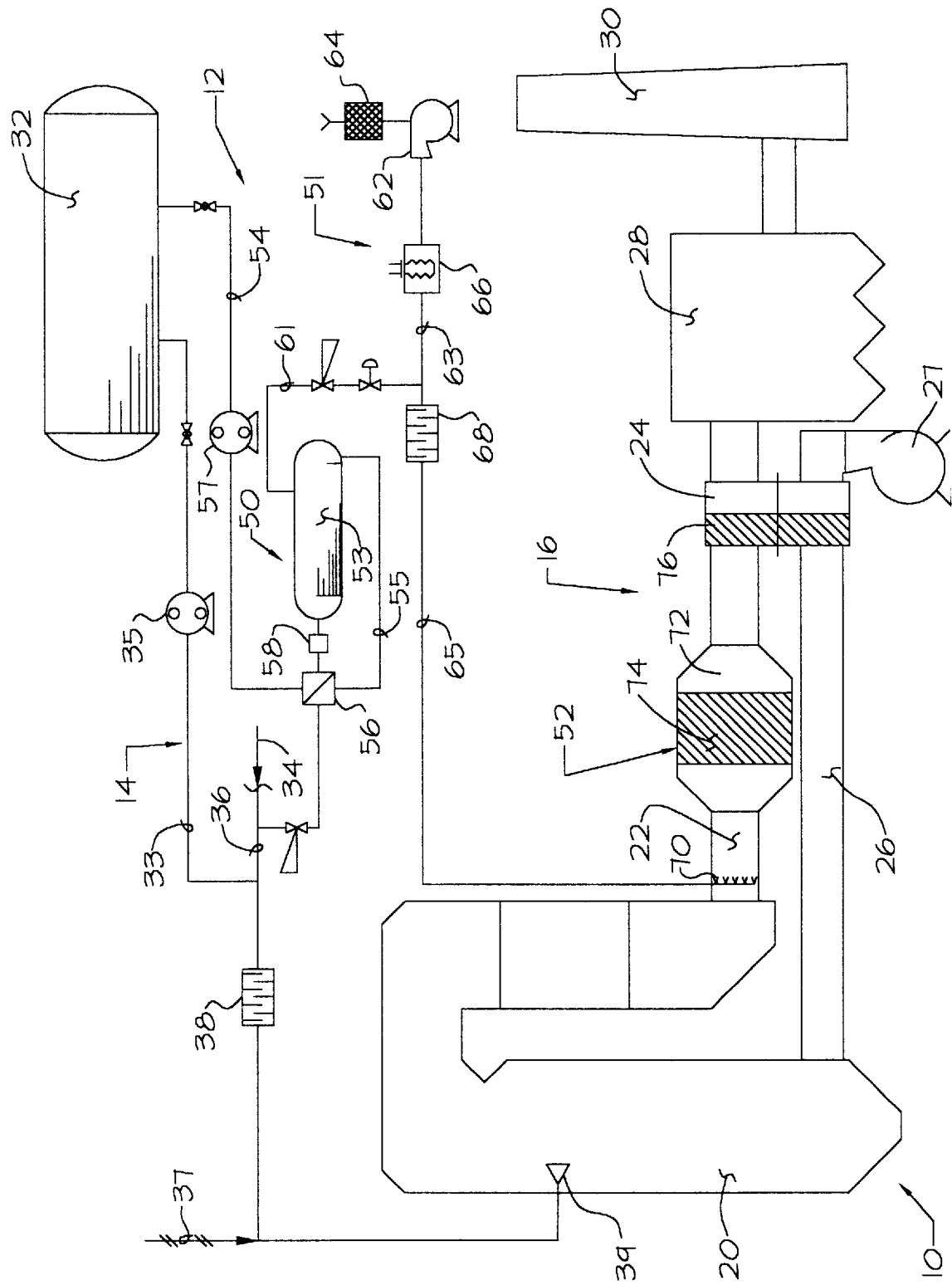

COMBINED SCR/SNCR PROCESS

BACKGROUND OF THE INVENTION

1. Field of the Invention

The invention relates generally to the reduction of nitrogen oxides from flue gas, and, more particularly, to a combined SNCR/SCR process for reducing the level of nitrogen oxides from the flue gas of a fossil fuel fired furnace.

2. History of the Related Art

The combustion of fossil fuels (e.g. coal) in power plants to produce power generates undesirable nitrogen oxides (NOx), usually in the form of a combination of nitric oxide (NO) and nitrogen dioxide ($NO_2$). It is known that under certain operating conditions the NOx level in a flue gas stream can be lowered by reacting the NOx with ammonia to produce harmless water and nitrogen as products. The NOx reducing reaction with ammonia can occur at relatively high temperatures, in the absence of a catalyst, in a process known as selective non-catalytic reduction (SNCR). The reaction can also occur at significantly lower temperatures, in the presence of certain catalysts, in a process known as selective catalytic reduction (SCR).

Several processes have been disclosed in prior art which attempt to combine an SNCR process with an SCR process. Typically, in the known so-called combined or "Staged" SNCR/SCR processes, a nitrogenous treatment agent, such as urea, is introduced within the boiler, at a location where the flue gas temperature is still high enough to effectively promote the non-catalytic reduction of NOx by ammonia, typically in the range of 1600° F. to 2100° F. To extract additional NOx reduction, catalysts are typically installed downstream from the location of the SNCR temperature region, at a point where the flue gas is at a temperature effective for the SCR process, typically in the range of 550° F. to 780° F. As the flue gas containing the excess ammonia remaining from the SNCR stage passes the catalyst, the excess ammonia reacts with the NOx. In most rationale approaches, as well as in the instant invention, reliance on simply the vagaries of the excess ammonia from "slip" passed from SNCR stage, is believed to be inefficient, non-reliable, and potentially harmful (i.e. uncontrolled ammonia slip and/or maldistribution). Further, by not relying solely on ammonia slip, or overloading, from the SNCR phase, the necessity for enhancers may be eliminated or greatly alleviated. Finally, limited tests on known SNCR/SCR systems which have been produced to date have illustrated that because of such factors as mal-distribution of NOx and ammonia at the face of catalyst from SNCR ammonia slip, the SCR performance is better enhanced by use of an independent ammonia injection grid to complement the ammonia supplied by slip from the SNCR stage (i.e. see the paper titled "Selective Catalytic Reduction Performance Project at Public Services Electric and Gas Company's Mercer Generating Station Unit No. 2", which was believed to have been presented at the Spring 1995 EPRI NOx Conference in Kansas City, Missouri. With the invention herein, and in other instances, the primary or supplemental supply of ammonia for the SCR phase, is from a selectively controllable source, independent of slip.

U.S. Pat. No. 4,302,431 to Atsukawa et al. discloses a process and apparatus for controlling nitrogen oxides in exhaust gases involving introducing ammonia into an exhaust gas at 700° C. (1292°) to 1300° C. (2372° F.), and then passing the exhaust gas over a catalyst at a temperature between 300° C. (572° F.) to 500° C. (932° F.) (preferably with the introduction of additional ammonia) to decompose remaining NOx and ammonia.

U.S. Pat. No. 4,978,514 to Hofmann et al. discloses a combined catalytic/non-catalytic process for nitrogen oxides reduction. The process of Hofmann et al. requires that, after the SNCR stage, sufficient ammonia is present in the effluent to react with the remaining effluent NOx in the catalyst stage. The Hofmann et al. process also utilizes an enhancer such as oxygenated hydrocarbons, heterocyclic hydrocarbons having at least one cyclic oxygen, sugar or molasses.

U.S. Pat. No. 4,981,660 to Leach discloses a selective hybrid NOx reduction process which utilizes an upright housing such as a natural draft heater tower. In the Leach process, a sufficient amount of reagent ammonia or ammonia radical must be added for the non-catalyst stage such that excess unreacted reagent remains for the catalyst stage.

U.S. Pat. No. 5,057,293 to Epperly et al. discloses a multi-stage process for reducing the concentration of pollutants in an effluent. The Epperly et al. multi-stage process reduces the nitrogen oxides concentration in the effluent such that an approximately 1:1 ratio of ammonia to nitrogen oxides remains in the effluent exiting the SNCR stage to provide ammonia for the SCR stage.

A related process is disclosed in U.S. Pat. No. 5,139,754 to Luftglass et al. The disclosed catalytic/non-catalytic combination process for nitrogen oxides reduction requires the introduction of a nitrogenous treatment agent for the non-catalytic stage in such an amount that ammonia remains in the treated non-catalytic effluent to be used for the SCR stage.

U.S. Pat. No. 5,233,934 to Krigmont et al. discloses a control method of reducing NOx in flue gas streams utilizing an SNCR treatment followed by an SCR treatment. The Krigmont et al. method tries to maximize the NOx removal in the SNCR stage, subject to certain ammonia slip restrictions, and injecting additional ammonia for the SCR stage Another related patent, U.S. Pat. No. 5,286,467 to Sun et al. discloses a hybrid process for nitrogen oxides reduction in which a nitrogenous treatment agent other than ammonia is introduced in such a quantity that ammonia is present in the treated effluent leaving the non-catalytic stage. If the SNCR stage does not generate sufficient ammonia for the SCR portion, the process of the Sun et al. patent also provides a source of ammonia to make up the difference. U.S. Pat. No. 5,853,683 illustrates a process similar to the '467 patent.

U.S. Pat. No. 5,510,092 to Mansour et al. discloses a combined SNCR/SCR process in which SCR is employed for primary NOx reduction and $NH_3$ is injected into the SNCR zone only when the NOx content of the SCR effluent exceeds a preselected design maximum value.

The known hybrid SNCR/SCR related processes typically attempt to maximize the efficiency and chemical utilization of the SNCR so as to minimize the level of nitrogen oxides remaining in the flue gas for processing by the SCR stage, while simultaneously producing excess $NH_3$. A known deficiency of such an SNCR/SCR processes is that the intentional injection of excess SNCR reagent is not the least cost methodology of providing for ammonia reagent within flue gas.

A review of the above described prior art clearly illustrates that, in instances where mandated levels of post combustion NOx reduction do not require full scale stand alone SCR systems (i.e. see U.S. Pat. No. 5,853,683), combined SNCR/SCR systems of the general type discussed above may be a reasonable solution. Furthermore, to better insure reliability, uniformity, flexibility, responsiveness and overall system control, the most appropriate combined SNCR/SCR system, will include a source of ammonia for the SCR stage of the system, which is at least in part, separate from any dependence on ammonia slip (natural or forced) from the SNCR stage.

While combined SNCR/SCR systems hereinbefore have to some extent addressed the need to provide a separate ammonia supply for the SCR stage, this very requirement of providing an independent ammonia supply has greatly inhibited this approach. In this regard, the SNCR stage is typically performed by injecting urea solution into the furnace where relatively high temperatures serve to initiate the breakdown of urea to form the transient species, including ammonia, which lead to effective NOx reduction. As such, in a typical urea based SNCR system, there is no need to transport, handle and store ammonia on the plant site. On the other hand it has been suggested, from time to time, to attempt to utilize ammonia, rather than urea, as the basic feedstock in an SNCR system however, because of the rapid reaction of ammonia at the high temperatures within a boiler, effective distribution across the boiler cross section may only be performed with high flow of carrying media (i.e. air or steam), and has not proved to be economical in many situations. Thus, inasmuch as direct feed of urea to SCR is not a reasonable substitute for the direct feed of ammonia to the SCR injection grid, nor is the direct feed of ammonia to a boiler for SNCR a practical approach, herein lies the problem of past approaches of having to handle both benign urea and toxic ammonia if an SCR assist to an SNCR system was desired.

Ammonia for SCR uses such as described above, is generally delivered to power plants in the form of anhydrous ammonia, or aqueous ammonia. Ammonia is gas at ambient temperatures and pressures, and is normally shipped and stored as a liquid, either in pressure vessels at ambient temperature, and high pressure (i.e. over 16 bars), or in refrigerated vessels at ambient or nearly ambient pressure, and at about –33° C. It is transported in bulk in ships, barges, and railroad tank cars, and in tank trucks on public roads and highways. It is frequently stored in large quantities at industrial sites in populated areas and is frequently used as the working fluid in large refrigeration systems. It is now coming into wider use for the removal of NOx from flue gas at power generating stations in urban areas.

Anhydrous ammonia is an extremely hazardous, toxic, and volatile material. In the event of an accidental discharge, it can cause immediate death to humans and animals and rapid death to trees and plants. Both anhydrous liquid ammonia, and concentrated aqueous liquid ammonia, display a deadly characteristic which substantially increases the risk of widespread injury and death in case of a spill. Specifically, upon sudden release to the atmosphere, as might occur in a sudden and accidental discharge (i.e. a storage failure at a power plant, a train wreck, or a traffic accident), and the pressure and temperature are sufficiently high, the liquid ammonia will become airborne as a mixture of very fine liquid droplets that do not fall to the ground, provided that no obstacles are encountered in the immediate vicinity of the release. The droplets evaporate quickly as air is entrained. The evaporation process cools the air so that a cold mixture of air and ammonia vapor is formed (i.e. a dense cloud of poisonous ammonia in a potentially deadly concentration). Unlike gaseous ammonia, which, though toxic, is lighter than air and quickly dissipates to harmless concentrations, the cloud can persist for a surprisingly long time, as long as several hours, before it finally disappears. The cloud is typically heavier than air and tends to drift along the surface of the earth, i.e., the ground or the surface of a body of water. The cloud moves with the wind and can sweep over a total area, i.e., a "footprint," much larger than the area covered by the cloud at any one moment. Contact with the cloud can be instantly incapacitating, and a single breath may be fatal. Substantial numbers of bulk shipments of anhydrous ammonia routinely move through or near densely populated areas. It is roughly estimated that an anhydrous ammonia spill from a 40,000 pound truck trailer would generate a cloud having an average lethal footprint of 29 acres, that is, an area of 29 acres in which the concentration of ammonia would reach a lethal level, about 0.5 percent, before the cloud eventually dissipated.

In addition to the inherent danger of storing, transporting and handling large quantities of ammonia, the expense insofar as safety aspects, insurance costs, specialized training, and the difficult to quantify emotional exposure of living and working next to a such potential catastrophe, it is apparent that if another, less hazardous commodity could be transported instead of ammonia, and then be readily used instead of transported aqueous or anhydrous ammonia, the hazards and/or expenses associated with ammonia shipment and handling would be considerably reduced. To some extent, attempts have been made in the supply of ammonia for NOx control in power plant environments by substituting concentrated aqueous liquid ammonia for anhydrous ammonia. Such a solution has achieved only limited success, due to any number of factors, for example: the high energy cost of vaporizing the water carrier, relatively costly storage facilities; and, even though aqueous ammonia is safer to handle than anhydrous ammonia, it is still very difficult and costly to handle in a safe manner.

Urea is an ideal candidate as an ammonia substitute. Urea is a non-toxic chemical compound and, for purposes of this discussion, presents essentially no danger to the environment, animals, plant life and human beings. It is solid under ambient temperatures and pressures. Consequently, urea can be safely and inexpensively shipped in bulk and stored until it is used to produce a gaseous mixture containing ammonia. It will not leak, explode, be a source of toxic fumes, require pressurization, increase insurance premiums, require extensive safety programs, or be a concern to the plant, community and individuals who may be aware of the transportation and/or storage dangers of ammonia. Best of all, in the invention herein, which incorporates an improved SNCR/SCR combined system, urea is already present for the SNCR phase.

By utilizing the urea feedstock and the teachings of the SNCR/SCR systems to date, and by further incorporating the teachings of the present invention of integrating a urea to ammonia sequence in the process, the hereinabove discussed deficiencies of prior systems are overcome or, in the least, greatly alleviated. Thus the invention herein teaches a concept where the advantages of an improved combination SNCR/SCR system can be achieved without the necessity of transporting and storing aqueous or anhydrous ammonia.

SUMMARY OF THE INVENTION

The invention herein teaches a combined SNCR/SCR system for NOx removal, which uses a common urea source for providing a reducing agent for both the SNCR and SCR subsystems. For the SNCR process the urea solution is drawn directly from the storage vessel, and diluted to an appropriate operative concentration (i.e. 10 to 40%, preferably no more than 35%, depending upon operating parameters), prior to injection into the furnace. For the SCR section of the process, urea solution is processed to produce gaseous ammonia, prior to injection into the SCR grid. In the preferred embodiment discussed in detail hereinafter, the urea for the SCR subsystem is passed through a hydrolyzation vessel to produce a gaseous mixture containing ammonia and $CO_2$ and water vapor, as well as a weak solution of urea. The weak urea solution is directed to the SNCR system, where it is mixed with the solution or water used to dilute the stored urea solution, prior to its injection into the furnace.

The ammonia containing gaseous mixture is drawn from the hydrolyzer as required for injection into the flue gas via SCR injection grid. Normally the gaseous mixture will be diluted significantly before injection. Because the weak urea solution is used as part of the SNCR dilution fluid, there is no waste to contend with, nor are there concerns with recycling sequencing, purification catalysts, and the like.

The invention herein is drawn to the concept of introducing a much needed improvement to a combined SNCR/SCR system, which provides at least some of the ammonia requirement for the SCR subsystem from a source other than carryover from the SNCR process; however, it does not require the storing of anhydrous or aqueous ammonia. In this regard, the invention incorporates a suitable source of converting a benign nitrogenous compound to ammonia, when required. At this point applicant believes that the most efficient source for this conversion, is through hydrolysis of urea to ammonia, the concept of which has been described in detail hereinbefore in any number of patents, for example: U.S. Pat. Nos. 4,220,635, 5,252,308, 5,281,403, 5,240,688, 5,399,325, 5,543,123, and Japanese Patent No. HEI 2-191528, all of which addressed the considering urea as a feedstock for conversion to ammonia. The reader is also referred to copending U.S. patent application Ser. No. 09/173,959, filed Oct. 16, 1998, in which the applicant is a co-inventor.

In summary, in instances where a NOx reduction requirements are not so severe that conventional full scale SCR systems are required, combined SNCR/SCR systems of the present invention should be considered over stand alone SCR systems and/or prior combined SNCR/SCR systems for the following potential benefits:

Ability to provide staged performance and staged costs

High efficiency performance while balancing capital and operating costs

Less need, if any, for additives or enhancers

Minor impact on plant operations ($NH_3$ slip, pressure drop)

Non-intrusive, easily retrofitted, expandable

A more flexible NOx reduction system, particularly considering the wide range of control of ammonia supply offered by the instant invention Flexibility, coupled with safe operation and the lack of health concerns Benign feedstock, with safe storage and transportation The present invention has been made in view of the above-described inadequacies of the related art and has as an object to provide a new combined SNCR/SCR process which utilizes urea as the basic feedstock for both the SCR and SNCR processes, in a safe and efficient manner.

Yet another object of the present invention is to provide a combined SNCR/SCR process which is highly controllable and demand responsive.

Still another object of the present invention is to provide a combined SNCR/SCR process which is predictable and reduces the perceived necessity to "drive" the SNCR to an maximum injection rate, and in a manner to better insure the uniformity and the efficiency of NOx destruction.

A further object and advantage of the present invention is to relieve, or in the least greatly alleviate, the need of enhancers in the SNCR portion of combined SNCR/SCR systems, along with the potential process complexities accompanying such enhancer usage.

The above and other additional objects and advantages of the present invention will become more readily apparent from the detailed description which follows, considered in conjunction with the accompanying drawing figures.

BRIEF DESCRIPTION OF THE DRAWINGS

In the accompanying drawing:

The FIGURE is a schematic illustration of a process in accordance with a preferred embodiment of the present invention.

DETAILED DESCRIPTION OF THE PREFERRED EMBODIMENT

The FIGURE schematically illustrates a fossil fuel burning power plant 10 which utilizes a combined SNCR/SCR system 12 of the present invention therewithin. A carbonaceous fuel such as coal is combusted with air in a furnace 20 and produces, in addition to power, combustion products contained within the flue gas. The flue gas contains nitrogen oxides (NOx), fly ash, and other undesirable pollutants. The system 12 includes an SNCR subsystem 14 for reducing NOx within the furnace 20, and an SCR subsystem 16 for reducing NOx downstream from the furnace.

The combustion flue gas exits from the furnace 20 into an exhaust duct assembly 22. The exhaust duct assembly 22 extends from the furnace 20 through a known air preheater 24, typically of the rotary regenerative type. The air preheater 24 is provided to absorb heat on the gas side, and use such absorbed heat to heat incoming air on the air side of the preheater 24. The inlet or combustion air is directed to the furnace 20 through the inlet duct assembly 26. The flue gas passes from the preheater 24, through a suitable cleaning device, such as a baghouse or, as shown, an electrostatic precipitator, schematically illustrated as 28, and is exhausted from the power plant 10 through a stack 30.

The discussion of the power plant 10 is intended to be highly schematic in nature, and to provide the information and background necessary to understand, practice and enable the present invention. In an operating power plant, there are typically many other systems, as well as alternative systems, that are not shown here. The present invention is compatible with such other systems and may, wherever applicable, be used with them.

The level or amount of nitrogen oxides in the flue gas is an important consideration in the process of the present invention. The nitrogen oxides level varies greatly during the operation of a single power plant boiler. Some power plant boilers can experience load changes of from 20% to 100% of their capacity during normal operation. Higher loads require the combustion of greater quantities of carbonaceous fuel within the same fixed furnace volume, increasing peak combustion temperatures and amount of fuel and air, thus producing higher levels of nitrogen oxides. Furthermore, changes in the boiler operating condition, for example: varying levels of excess air; implementing flue gas recirculation; co-firing; burners out of service; changing the type of fuel fired (e.g. natural gas, fuel oil, or coal), and changing the fuel preparation and pulverization techniques can vary NOx production by a factor of three or more. Thus, greatly varying levels of nitrogen oxides that are produced at different times by a single power plant boiler. As such, the SNCR/SCR system 12 of the present invention should be designed to quickly and efficiently respond to these varying demands on short notice.

The SNCR subsystem 14 comprises: a storage facility 32 which receives a nitrogenous solution, such as a commercially premixed urea solution at a standard concentration of around fifty per cent; a conduit assembly 33 for providing urea under pressure from the storage facility 32 to the furnace 20; a source 34 of primary dilution liquid, such as water, provided under pressure through conduit 36 to reduce the urea concentration supplied through conduit 33, before injection into the furnace 20. A suitable mixer assembly 38 is placed in conduit assembly 36 to insure mixing of the higher concentration urea solution with the dilution solution prior to the diluted urea solution being injected into the furnace 20. A pump 35 communicates with conduit assembly 33, and is operative to selectively vary the quantity of urea drawn from facility 32 to the SNCR subsystem 14.

Thus, there is provided at subsystem 14, a source of a nitrogenous treatment agent, in this case urea, which is capable of effectively reducing a portion of the nitrogen oxides contained in the flue gas to water and elemental nitrogen through selective non-catalytic reduction (SNCR). Prior to injection into the furnace 20, the urea solution is mixed, in a known manner, with an atomizing air (or other gaseous transport media) provided at 37, and the resulting urea treatment mixture is injected in any suitable manner (not shown, but schematically illustrated at furnace injectors 39) into the flue gas stream at a point where the temperature is preferably between 1600° F. and 2100° F. Although not shown, it is understood that the urea solution may be injected into the furnace 20 at multiple locations and, further, if desired, various additives may be added to the injected urea solution to enlarge the available temperature "window" for NOx reduction within the furnace 20. Preferably, the amount of urea injected into the furnace 20 should not be enough to produce substantial ammonia slip from the furnace 20; however, if such occurs, the downstream SCR system will be sufficient to use the slip during the SCR process.

The SCR subsystem 16 comprises: a hydrolyzer assembly 50; a urea supply conduit 54 for supplying urea to assembly 50; an ammonia dilution portion disposed intermediate the hydrolyzer assembly 50 and an injection grid 70; and a catalyst portion 52. As illustrated, the catalyst portion 52 includes catalyst bank 74 of any conventional type which is disposed within an expanded portion 72 of the exhaust duct assembly 22. In the embodiment shown, SCR portion 52 also incorporates an additional catalyst bank 76 in the hot and, perhaps, intermediate layers of the air preheater 24. Discussions on the applications and locations of catalysts such as shown at banks 74 and 76 may be seen in U.S. Pat. Nos. 5,853,683 and 4,602,673. The catalyst composition and configuration may be of any suitable type, see for example: the brochure titled "SiNOx Catalysts: The best Solution for Nitrogen-Oxide Reduction", which was published by Siemens Power Corporation under its designation A96001-U11-A294-V2-7600; and the brochure titled "BASF DeNOx Catalysts", identified as BASF Publication No. RCK 9204E-0692-3.5.

The SCR reaction occurs during passage of the flue gas stream, through one or more of the catalyst banks 74 and 76. The temperature of the flue gas as it passes through the catalyst is preferably between approximately 300° F. and approximately 1000° F., and more preferably between approximately 450° F. and approximately 800° F. for the SCR reaction to efficiently occur. The SCR reaction requires a nitrogeneous compound, preferably ammonia, to occur efficiently at these preferred temperatures. In this regard, the SNCR/SCR system of the present invention incorporates a means for delivering ammonia for the SCR subsystem, which is not fully dependent on ammonia carry over from the SNCR process and, further, does not require storage or handling of large quantities of ammonia on site. All ammonia used in the combined SNCR/SCR system on the present invention is used almost immediately after its creation.

As can be seen from a review of the above, the combined SNCR/SCR system of the present invention is extremely flexible and is useful over a wide range of operating situations and NOx reduction circumstances. On the other hand, it is to be noted that, in addition to overall percentage NOx reduction limitations, the invention herein must be balanced for injection flow rate considerations to insure that the weak urea solution from the hydrolyzer being directed for use with the SNCR sub-system 14 does not cause an excess of the preferred amount of diluted urea solution being injected into the furnace 20 for the selective non-catalytic reduction. A similar limitation exists with respect to the concentration of urea in the diluted solution being injected into the furnace 20 (i.e. the concentration of the weak urea solution leaving the hydrolyzer, which is being directed to the SNCR system, will not result in a higher than preferred amount of diluted urea solution being injected into the furnace 20).

With the above in mind, the FIGURE illustrates the gaseous ammonia delivery portion 50 which includes: a hydrolyzer 53; a urea supply conduit 54 which communicates between the urea storage facility 32 and the hydrolyzer 53; a metering pump 57 deposed within conduit 54; and a flow-through conduit 55 communicating between the hydrolyzer 53, adjacent the end of the hydrolyzation process for the urea flowing there through, and the supply of dilution liquid through conduit 36. A "fluid to fluid" heat exchanger 56 is positioned at a cross over point of conduits 54 and 55 so that the residue heat of the weak urea solution flowing through the conduit 55 (the solution leaves the hydrolyzer at a temperature, for example in the range of 190 to 250° C. ) is used to raise the temperature of the fresh urea solution entering the hydrolyzer 53. An additional heater, shown as in-line heater 58, is positioned in conduit 54 downstream from the heat exchanger 56, to further raise the temperature of the incoming fresh urea solution to the temperature required for hydrolyzation. If desired, the heater 58 can be replaced, or supplemented by a heater (not shown) positioned within the hydrolyzer 53 adjacent the inlet end thereof. Heaters used for heating the urea solution can be of any suitable type, and may be either electricity or steam based.

The hydrolyzer 53 operates at a suitable temperature and pressure range (i.e. 190 to 250° C. and 13 to 40 bar, respectively), in order to promote the hydrolysis of the urea into a gaseous mixture containing $NH_3$ and $CO_2$, in accordance with the following formula:

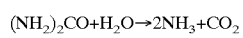

$$(NH_2)_2CO + H_2O \rightarrow 2NH_3 + CO_2$$

The gaseous mixture containing ammonia, $CO_2$, and water vapor is withdrawn from the hydrolyzer through valved conduit 61. The broad concept of urea hydrolysis is a well known concept and a detailed description thereof is not believed to be necessary to those skilled in the art of this invention. For further description of urea hydrolysis, reference is hereby made to the hereinabove cited references. It should be mentioned, however, that the hydrolysis reaction is overall endothermic in nature and, as such, suitable means (not shown) such as steam or electric heater must be provided to maintain the urea solution passing through the hydrolyzer at an efficient temperature for hydrolyzation.

Conduit 61, carries a gaseous mixture containing a high proportion of ammonia (i.e. 15 to 35 per cent by volume), which is too high for most uses (i.e. ammonia content as a percent of the air mixture in SCR applications, depending upon particular circumstances, should generally be in the range of 3 to 10%, which is significantly below the explosion limit for such a mixture). Accordingly the preferred embodiment herein also incorporates the dilution portion, which comprises: a dilution blower 62, which pulls filtered air through filter 64 into the dilution conduit 63. A suitable air heater 66 is provided for heating the dilution air to insure that the diluted gaseous mixture containing ammonia does not drop below process parameters. The gaseous mixture containing ammonia in conduit 61, is combined with the dilution air in conduit 63, at mixer 68, and then passed through the diluted gaseous ammonia conduit 65 for subsequent injection into the flue gas stream for use in the SCR process. In the example shown, the gaseous ammonia from conduit 65 is injected into the flue gas stream via an injection grid 70 positioned in the exhaust duct assembly 22 intermediate the discharge of the furnace 20, and the inlet of the catalyst module section 52. This location will serve to deliver ammonia required for NOx reduction by SCR to catalyst banks 74 and 76; however, if it were deemed necessary or desirable to have a separate supply of ammonia to the air preheater bank 76, suitable valving and conduit modifications can be readily made by one skilled in the art.

In summary the invention herein recognizes that there is no doubt that, a combined or staged SNCR/SCR system is superior in flexibility and reduction capabilities, than solely an SNCR system, while still being below the permissive limitations of ammonia slip. Nevertheless, even though this concept has been marketed for some time and, further, its superiority has been proven in numerous situations (i.e. see the above sited paper presented at the EPRI Spring 1995 NOx Conference in Kansas City Mo.; the paper titled "Combination of SNCR and SCR NOx Emission Control Systems. Synergetic Effects and Customer Benefits", which was presented at Power Gen '96, Dec. 4–6, 1998; brochure titled "Staged NOx Reduction, published by Wahlco Environmental Systems", Inc. in 1997; the SCR/SNCR brochure published by Fuel Tech, Inc. in 1999; and a paper titled "Evaluation of Retrofitted Post Combustion NOx Control Technology on a Wet Bottom, Coal Fired Utility Boiler", presented at a symposium sponsored by the U.S. Department of Energy, Federal Energy Technology Center, on May 15–16, Pittsburgh, Pa.), acceptance of the combined SNCR/SCR system has not been widely adopted for a number of reasons, including: the expense and complexity of handling both a urea and ammonia feedstocks; the safety, health, public relations, insurance and compliance issues involved in handling large quantities of anhydrous or aqueous ammonia; and, the lack of alternative concepts prior to the inventive approach of the present invention. The combined SNCR/SCR of the present invention, is elegant in its approach, simplicity and efficiency and is destined to become the norm in applications of this sort.

While a preferred embodiment of the present invention is described hereinabove, it is to be understood and appreciated that any number of modifications can be made without departing from the scope of the invention, which is only defined by the scope of the claims set forth hereinafter. Examples of such modifications may include, but are not limited to: an additional tank may be provided to hold diluted urea solution prior to injection into the furnace 20 and, if so provided, the weak urea solution returned via conduit 55 can be provided directly to the additional tank for the make up of the diluted urea solution therein; if circumstances dictate, only weak urea solution returned by conduit 55, with or without make-up or further dilution water, can be provided for injection into the furnace 20 to promote the SNCR reaction, and no urea solution will be drawn from the storage facility 32 by pump 35; based on operational parameters, the flow through the hydrolyzer assembly 53 can be selectively varied; various additives or enhancers may be added to the working solution to assist in the SNCR reactions, if required (however, it is to be noted that the invention herein may alleviate any need for solution enhancers); although the preferred embodiment herein is primarily directed to combined systems where the primary NOx reduction is via the SNCR sub-system 14, and the SCR sub-system 16 if viewed as for make up, trim and ammonia slip control; the concept of using the SCR sub-system 16 for the primary NOx control, and using the SNCR sub-system 14 for make up and trip, is also a viable alternative, so long as the other operating limitations of the combined system 12 are maintained; and the like.

What is claimed is:

1. In a combined SNCR/SCR system for removing NOx from a flue gas stream of a fossil fuel burning facility, such as a power plant, the improvement in the method of providing the nitrogenous compound necessary for the respective process reactions, comprising the steps of:

providing a stored source of a urea based compound;

continuously directing a first portion of said compound to the SNCR section of the system for injection into the flue gas stream in a form, location and temperature zone which are appropriate for efficient selective non-catalytic reduction of NOx in the presence of such first portion;

selectively directing a second portion of said compound to an intermediate conversion system which is operative to convert a portion of said second portion of said compound to a gaseous mixture containing ammonia, and to leave a remaining portion;

after said last mentioned conversion, continuously integrating said remaining portion with said first portion; and directing to and consuming said gaseous mixture in said SCR section of the system.

2. A method SNCR/SCR system as specified in claim 1 wherein said urea based compound is an aqueous urea solution based compound which is maintained at a temperature above the crystallization temperature of said solution.

3. A method as specified in claim 2 wherein the temperature of the flue gas stream at the point of injection of said first portion into the flue gas stream is in the range of approximately 1600° F. to 2100° F.

4. A method system as specified in claim 3 wherein the first portion is diluted, so that the urea concentration of the first portion prior to injection is in the range of ten to forty percent.

5. A method system as specified in claim 4 wherein said remaining portion is directly integrated with said first portion prior to injection into such flue gas stream.

6. A method as specified in claim 4 wherein said remaining portion is indirectly integrated with said first portion, by first integrating said remaining portion with said source of urea based compound.

7. A method as specified in claim 3 wherein said intermediate conversion system includes the step of partially hydrolyzing the second portion to produce the gaseous mixture containing ammonia and said remaining portion.

8. A method as specified in claim 7 including the additional step of increasing the temperature of said second portion, prior to conversion of said second portion.

9. A method as specified in claim 8 wherein during said hydrolyzing, the pressure and temperature of the second portion is preferably maintained in the range of 19 to 34 bar and 210 to 240° C.

* * * * *